(12) United States Patent
Luo

(10) Patent No.: US 10,081,337 B2
(45) Date of Patent: Sep. 25, 2018

(54) WINDSHIELD WIPER

(71) Applicant: Xiangdong Luo, Zhejiang (CN)

(72) Inventor: Xiangdong Luo, Zhejiang (CN)

( * ) Notice: Subject to any disclaimer, the term of this patent is extended or adjusted under 35 U.S.C. 154(b) by 0 days.

(21) Appl. No.: 15/361,001

(22) Filed: Nov. 24, 2016

(65) Prior Publication Data

US 2018/0086311 A1    Mar. 29, 2018

(30) Foreign Application Priority Data

Sep. 28, 2016    (CN) .......................... 2016 1 0857825

(51) Int. Cl.
*B60S 1/38*    (2006.01)
*B60S 1/40*    (2006.01)

(52) U.S. Cl.
CPC .............. *B60S 1/3858* (2013.01); *B60S 1/38* (2013.01); *B60S 1/3849* (2013.01); *B60S 1/3853* (2013.01); *B60S 1/3867* (2013.01); *B60S 1/3881* (2013.01); *B60S 1/4009* (2013.01); *B60S 2001/3827* (2013.01); *B60S 2001/4058* (2013.01)

(58) Field of Classification Search
CPC .... B60S 1/3849; B60S 1/3851; B60S 1/3858; B60S 1/3853; B60S 1/3881; B60S 1/3856; B60S 2001/3827; B60S 2001/382; B60S 2001/4035; B60S 1/38; B60S 1/3867; B60S 1/4009; B60S 2001/4058

USPC ......................................................... 15/250.32
See application file for complete search history.

(56) References Cited

U.S. PATENT DOCUMENTS

| 2011/0113581 A1* | 5/2011 | Boland | B60S 1/381 |
| | | | 15/250.31 |
| 2015/0135466 A1* | 5/2015 | Foss | B60S 1/3858 |
| | | | 15/250.201 |
| 2016/0001745 A1* | 1/2016 | Yoshimoto | B60S 1/381 |
| | | | 15/250.38 |

FOREIGN PATENT DOCUMENTS

| JP | 2003-312451 | * 11/2003 |
| WO | 2005/118363 | * 12/2005 |

* cited by examiner

*Primary Examiner* — Gary Graham

(57) ABSTRACT

A windshield wiper comprising: a connector, an adapter, a steel blade, a rubber blade, a retainer, a retainer cover, and a sleeve; the connector having a third slot and a spring plate; the steel blade having holes disposed; the steel blade passing through the third slot, so that the steel blade is coupled with the third slot, and the spring plate is coupled with the holes; the connector and the adapter have multiple engaging components, so that the connector can combine together with the adapter by snap-fit connection. Therefore, the windshield wiper of the present invention has simple structure and secure assembly, not only reducing the production cost, but also easing maintenance.

4 Claims, 5 Drawing Sheets

WINDSHIELD WIPER

TECHNICAL FIELD

The present invention relates to car parts, particularly to a windshield wiper.

BACKGROUND OF THE INVENTION

The current windshield wiper usually coma rises a steel blade and a connector which are coupled together by a plurality of arm joints, so the manufacturing cost is high and the connection is not strong enough. Besides, since the assembling process between the adapter and the connector is complex, the combine force is not strong enough. Gradually, it is customary to integrate the adapter onto the connector, which is ultimately designed to include only a wiper with a connector, a retainer, and a retainer cover. Since the connector and wiper blade are connected together, once the connector is damaged, it needs to replace the entire wiper and will increase repairing costs. Accordingly, it urgently needs to devise a windshield wiper with simple and secure structures of the adapter and the connector.

DESCRIPTION OF THE INVENTION

The objection of the present invention is to overcome the deficiency of the complex assembling structures of the connector and the adapter, the all-in-one structure of the adapter and the connector, and the fragile connector by providing a windshield wiper with simple and secure structure of the connector and the adapter.

In order to solve the above-mentioned problems and achieve the objective of the present invention, the technical scheme is to provide a windshield wiper comprising: a connector (1), an adapter (2), a steel blade (3), a rubber blade (4), a retainer (5), a retainer cover (6), and a sleeve (7); the connector (1) having a third slot (105) disposed at a bottom thereof and a spring plate (102) disposed at a top thereof; the steel blade (3) having holes (301) disposed thereon; the steel blade (3) passing through the third slot (105), so that the steel blade (3) is coupled with the third slot (105), and the spring plate (102) is coupled with the holes (301); the steel blade (3) being fixed with the sleeve (7); the sleeve (7) including a second slot (702), and the connector (1) including, a fourth slot (107) disposed at a bottom thereof; the second slot (702) being aligned with the fourth slot (107); the rubber blade (4) being passed through the second slot (702) and the fourth slot (107), and fixed on the connector (1) and the sleeve (7); the rubber blade (4) being coupled with the fourth slot (107); the connector (1) having hinge seats (101), and the adapter (2) having hinge shafts (201) disposed at both sides thereof; one end of the adapter (2) being hingedly connected to the hinge seats (101) by the hinge shafts (201).

More particularly, wherein the adapter (2) comprises a ball-shaped convex point (203) disposed at the other end thereof, and the connector (1) comprises a ball-shaped concave point (106) disposed at an inner wall thereof; the convex point (203) is matched with the concave point (106).

More particularly, wherein the adapter (2) comprises first hooks (202) disposed at the both sides thereof, and the connector (1) comprises second hooks (104) disposed, at the inner wall thereof, the first hooks (202) are coupled with the second hooks (104).

More particularly, wherein the adapter (2) comprises a locating part (204) disposed at a bottom side thereof, and the connector (1) comprises an opening (103) disposed thereon, the locating part (204) is matched with the opening (103).

More particularly, wherein the rubber blade (4) comprises a rib (401), which is connected to the second slot (702).

Compared with the existing technology, the functions and effects of the present invention are described below:

The windshield wiper of the present invention comprises a plurality of slots disposed on different components that is configured to connect between the steel blade and the connector, and the rubber blade and the sleeve. Besides, the windshield wiper further comprises the spring plate and the hole to increase assembling force between the steel plate and the connector; on the other hand, the connector and the adapter have multiple engaging components, so that the connector can combine together with the adapter by snap-fit connection. Therefore, the windshield wiper of the present invention has simple structure and secure assembly, not only reducing the production cost, but also easing maintenance.

DETAILED DESCRIPTION OF THE INVENTION

Detailed descriptions are provided below based on the embodiment depicted in the accompanying draws.

Figure 1:
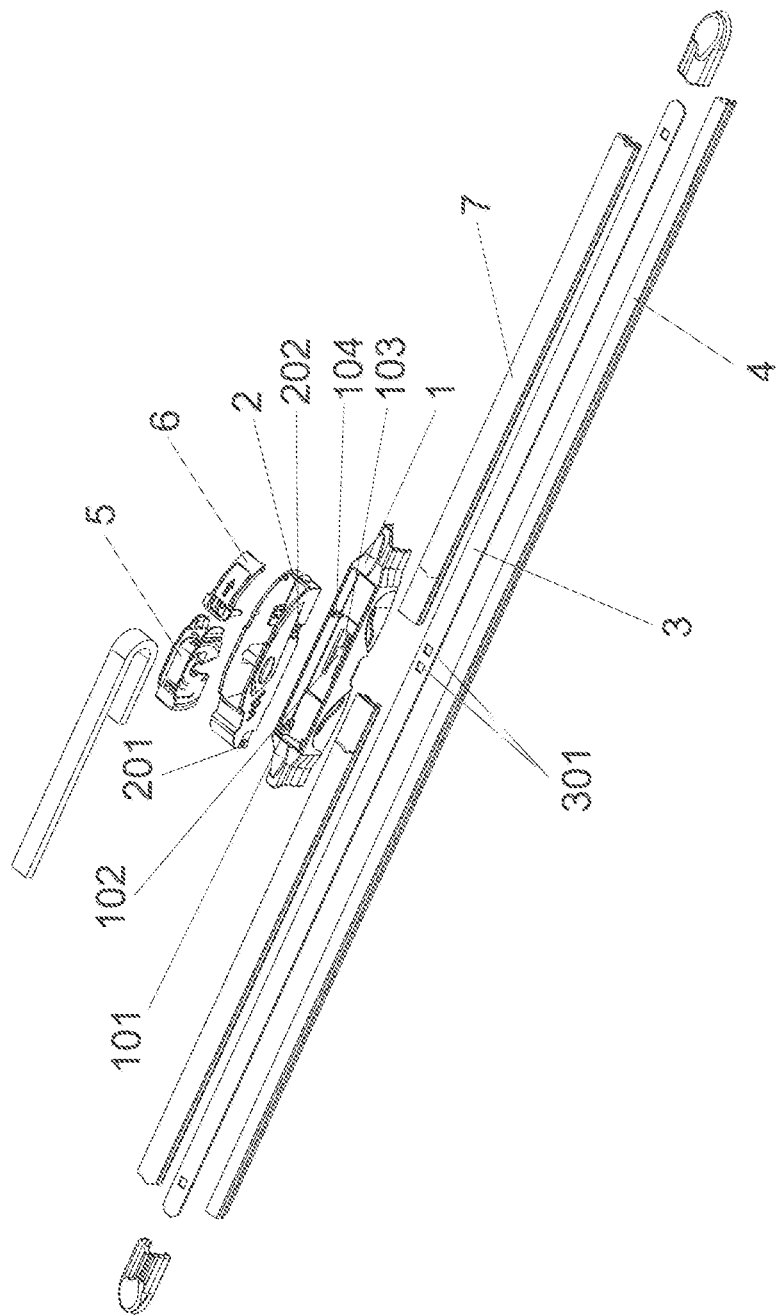
FIG. 1 is an exploded view of the present invention.
Figure 2:
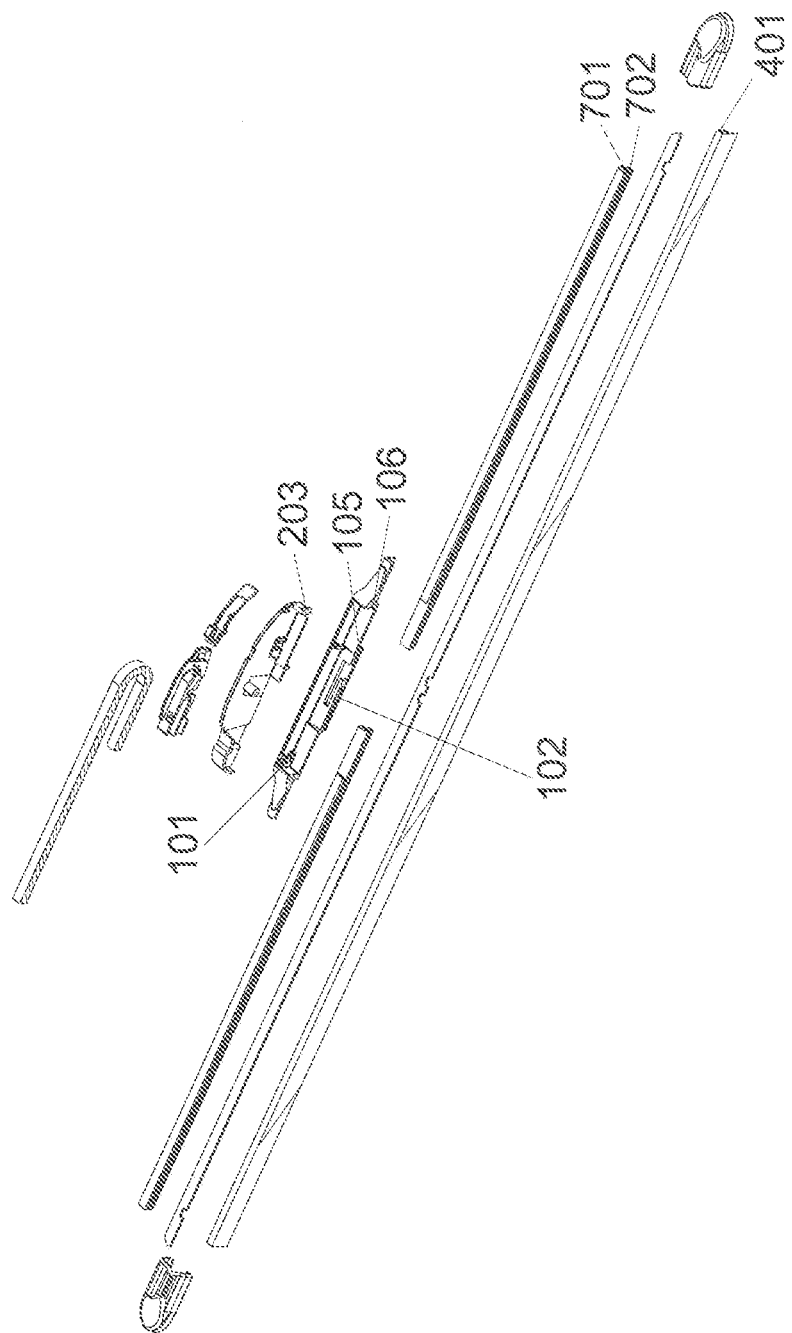
FIG. 2 is a cross-sectional view of the FIG. 1 of the present invention.
Figure 3:
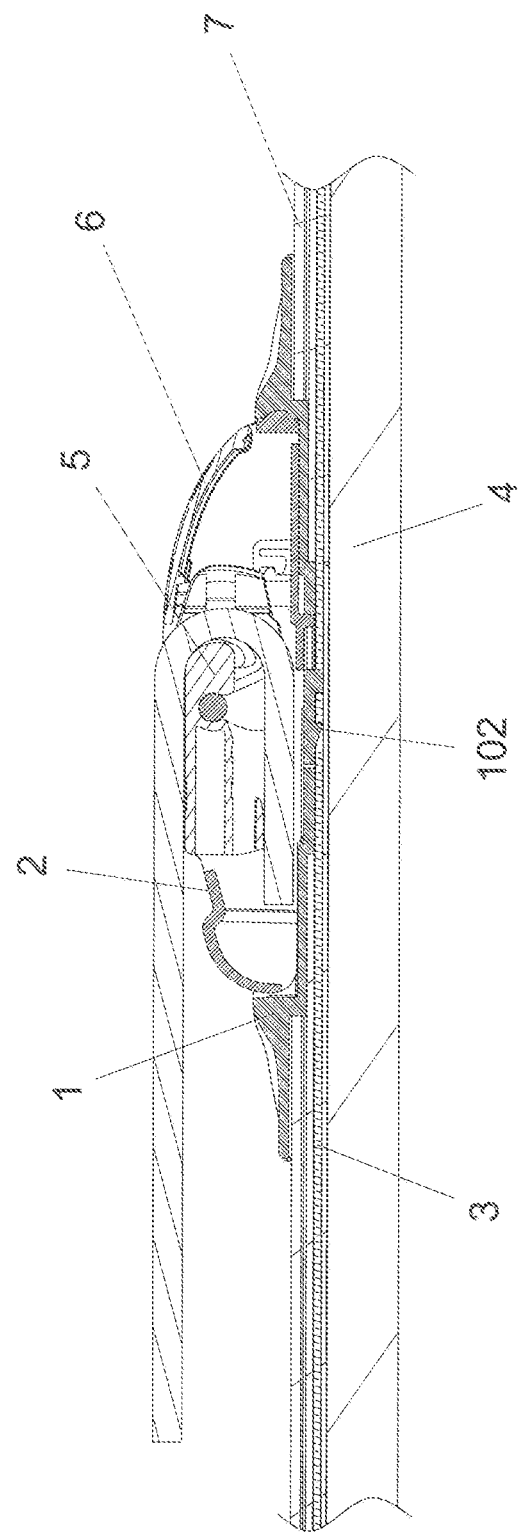
FIG. 3 is a partial cross-sectional view of the present invention.
Figure 4:
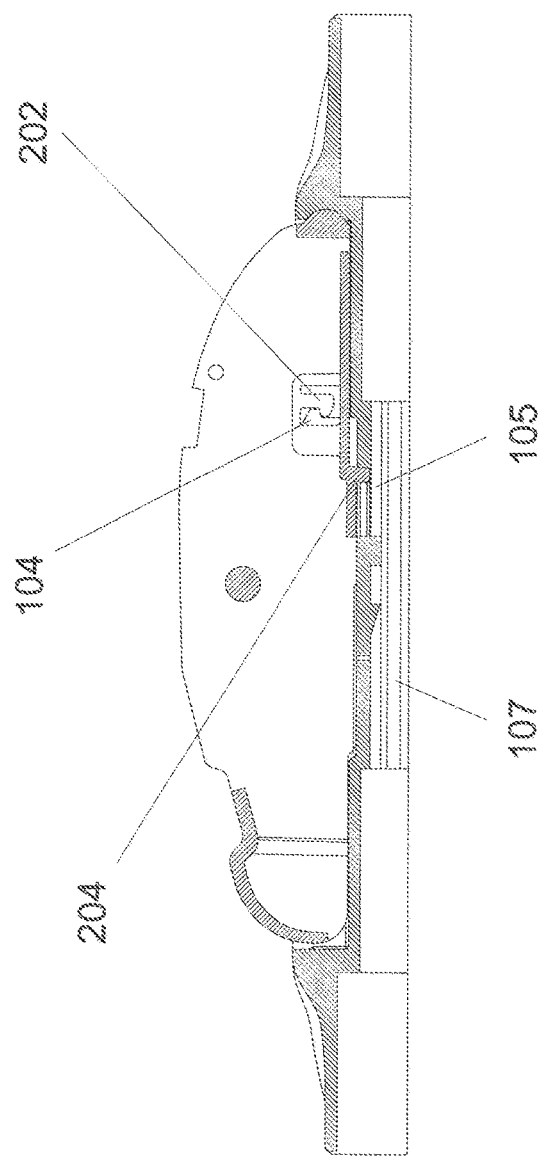
FIG. 4 is a cross-sectional view of the present invention showing the adapter coupled with the connector.
Figure 5:
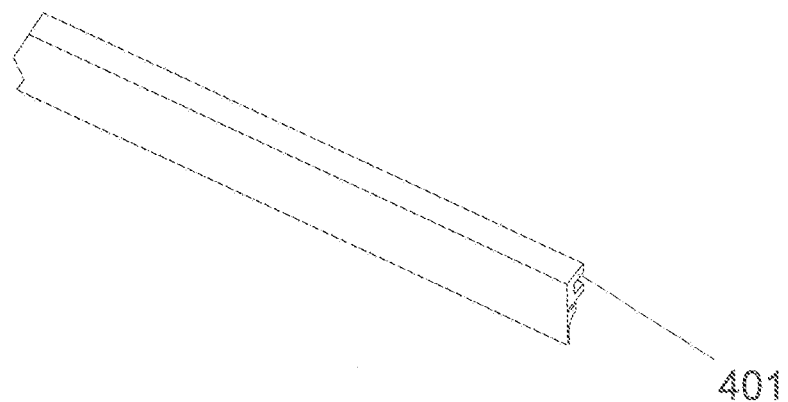
FIG. 5 is a partial enlarged view of the rubber blade of the present invention.
Figure 6:
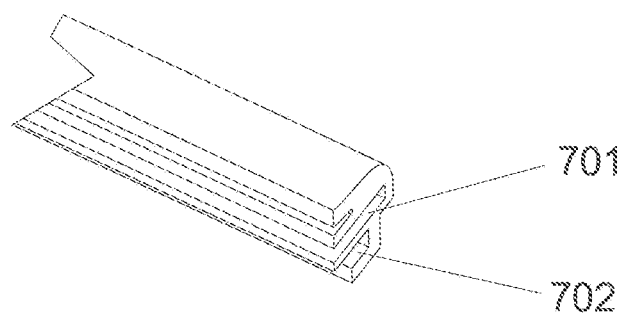
FIG. 6 is a partial enlarged view of a sleeve of the present invention.

Referring to FIGS. 1-6, a windshield wiper comprises a connector (1), an adapter (2), a steel blade (3), a rubber blade (4), a retainer (5), a retainer cover (6), and a sleeve (7).

The connector (1) comprises a third slot (105) disposed at a bottom thereof and a spring plate (102) disposed at a top thereof; the steel blade (3) comprises holes (301) disposed, thereon; the steel blade (3) passes through the third slot (105), so that the steel blade (3) is coupled with the third slot (105), and the spring plate (102) is coupled with the holes (301).

The steel blade (3) is fixed with the sleeve (7); the sleeve (7) comprises a first slot (701) and a second slot (702), and the connector (1) comprises a fourth slot (107) disposed at a bottom thereof; the second slot (702) is aligned with the fourth slot (107); the rubber blade (4) is passed through the second slot (702) and the fourth slot (107), and fixed on the connector (1) and the sleeve (7), the rubber blade (4) being coupled with the fourth slot (107).

The connector (1) is installed with hinge seats (101), and the adapter (2) is installed with hinge shafts (201) disposed at both sides thereof; one end of the adapter (2) is hingedly connected to the hinge seats (101) by the hinge shafts (201).

More preferably, the adapter (2) comprises a ball-shaped convex point (203) disposed at the other end thereof, and the connector (1) comprises a ball-shaped concave point (106) disposed at an inner wall thereof, the convex point (203) is matched with the concave point (106).

More preferably, the adapter (2) comprises, first hooks (202) disposed at the both sides thereof, and the connector (1) comprises second hooks (104) disposed at the inner wall thereof, the First hooks (202) are coupled with the second hooks (104).

More preferably, the adapter (2) comprises a locating part (204) disposed at a bottom side thereof, and the connector (1) comprises an opening (103) disposed thereon, the locating part (204) is matched with the opening (103).

More preferably, the rubber blade (4) comprises a rib (401), which is connected to the second slot (702)

Through various slots disposed in the different components, the steel blade (3) is respectively connected with the connector (1), the rubber blade (4), and the sleeve (7). Besides, the spring plate (102) and the holes (301) increase the coupling intensity between the steel blade (3) and the connector (1). On the other hand, the connector (1) and the adapter have multiple engaging components, so that the connector (1) can combine together with the adapter (2) by snap-fit connection. Therefore, the windshield wiper of the present invention has simple structure and secure assembly, not only reducing the production cost, but also easing maintenance.

The above shows and describes the fundamental principles, major characteristics and advantages of the present invention. Those skilled in the art shall understand that the present invention is not limited by the foregoing embodiments, and the foregoing embodiments and description only explain the principles of the present invention. The present invention may also have various modifications and improvements without departing from the spirit and scope of the present invention, these various modifications and improvements shall all fall within the protection scope of the present invention claimed which is defined by the appended claims and equivalents thereof.

I claim:

1. A windshield wiper comprising:
a connector (1), an adapter (2) disposed at a top of the connector (1), a steel blade (3), a center portion of which is disposed on a bottom of the connector (1), a rubber blade (4) positioned under a bottom of the steel blade (3), a retainer (5) and a retainer cover (6) disposed on a top of the adapter (2), and two sleeves (7), adjacent ends of which are disposed between the connector (1) and the steel blade (3);
the connector (1) having a third slot (105) disposed at a bottom thereof and a spring plate (102) disposed at a top thereof; the steel blade (5) having holes (301) disposed thereon; the steel blade (5) passing through the third slot (105), so that the steel blade (5) is coupled with the third slot (105), and the spring plate (102) is coupled with the holes (301);
the steel blade (3) being fixed with the sleeve (7); the sleeve (7) including a first slot (701) and a second slot (702), and the connector (1) including a fourth slot (107) disposed at a bottom thereof; the second slot (702) being aligned with the fourth slot (107); the rubber blade (4) being passed through the second slot (702) and the fourth slot (107), and fixed on the connector (1) and the sleeve (7); the rubber blade (4) being coupled with the fourth slot (107);
the connector (1) having hinge seats (101), and the adapter (2) having hinge shafts (201) disposed at both sides thereof; one end of the adapter (2) being hingedly connected to the hinge seats (101) by the hinge shafts (201);
wherein the adapter (2) comprises a ball-shaped convex point (203) disposed at the other end thereof, and the connector (1) comprises a ball-shaped concave point (106) disposed at an inner wall thereof; the convex point (203) is matched with the concave point (106).

2. The windshield wiper according to claim 1, wherein the adapter (2) comprises first hooks (202) disposed at the both sides thereof, and the connector (1) comprises second hooks (104) disposed at inner walls thereof, the first hooks (202) are coupled with the second hooks (104).

3. The windshield wiper according to claim 1, wherein the adapter (2) comprises a locating part (204) disposed at a bottom side thereof, and the connector (1) comprises an opening (103) disposed thereon, the locating part (204) is matched with the opening (103).

4. The windshield wiper according to claim 1, wherein the rubber blade (4) comprises a rib (401), which is connected to the second slot (702).

\* \* \* \* \*